Jan. 20, 1931.  J. H. JOHNSON  1,789,336
FOOD PRESERVING CABINET
Filed Feb. 20, 1928   2 Sheets-Sheet 1
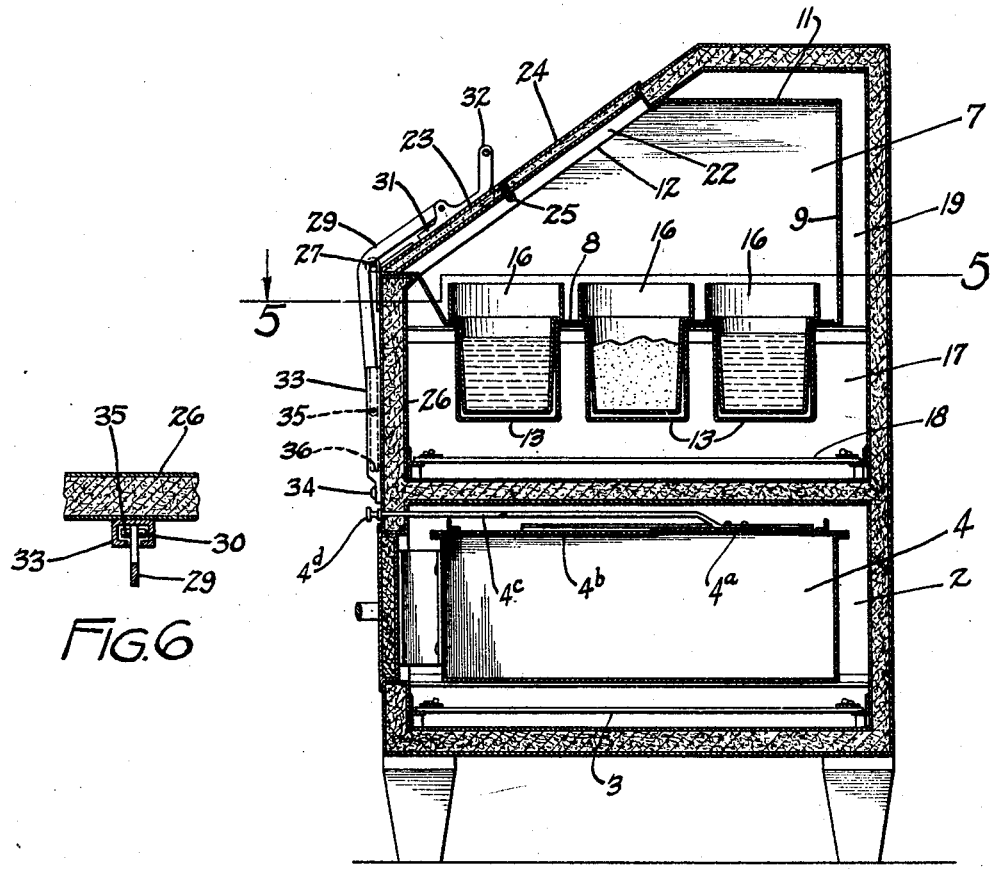
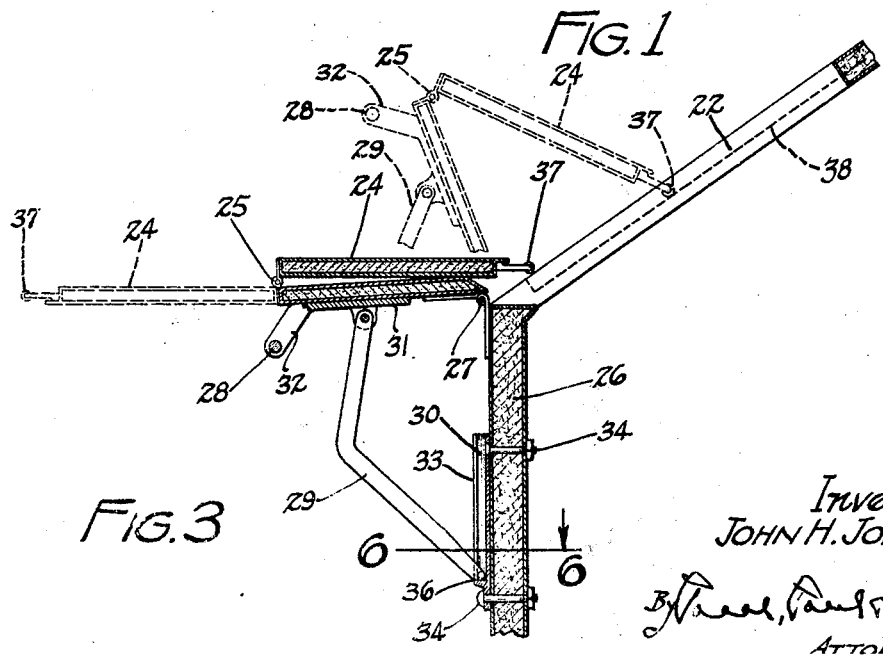
Inventor
JOHN H. JOHNSON
ATTORNEYS Jan. 20, 1931.  J. H. JOHNSON  1,789,336
FOOD PRESERVING CABINET
Filed Feb. 20, 1928  2 Sheets-Sheet 2

Inventor
JOHN H. JOHNSON
ATTORNEYS

Patented Jan. 20, 1931

1,789,336

UNITED STATES PATENT OFFICE

JOHN H. JOHNSON, OF CHULA VISTA, CALIFORNIA

FOOD-PRESERVING CABINET

Application filed February 20, 1928. Serial No. 255,820.

This invention relates to new and useful improvements in food-preserving cabinets of the general type shown in my pending application, Serial No. 739,957, filed September 25, 1924.

An object of the present invention is to provide a cabinet having a foldable door in its upper portion provided with means for supporting it in substantially a horizontal position, when open, whereby it may be temporarily used as a shelf or table top to support a tray or plate while the attendant places food therein.

A further object of the invention is to provide a food-preserving cabinet having an upper food dispensing chamber, one side of which is defined by an inclined wall having an opening therein adapted to be closed by a door comprising two hinged-together sections adapted to be folded one upon the other, when the door is in open position, and the lower door section being pivotally connected with a wall of the cabinet and having a pair of arms pivotally connected therewith, the lower ends of which are slidably engaged with the adjacent wall of the cabinet, and means being provided for arresting the downward movement of the arms whereby the arms will provide brackets for supporting the door in a horizontal position when opened.

A further object is to provide a food-preserving cabinet having a heated food storage chamber in the lower portion thereof and a food dispensing chamber in its upper portion, and one side of said chamber being defined by an inclined wall having an opening therein adapted to be closed by a door, comprising two sections suitably hinged together and adapted to be folded one upon the other, when the door is in open position, the lower door section being hinged to the front wall of the cabinet and having the upper ends of a pair of arms pivotally connected therewith, the lower ends of which are slidably mounted in vertical guides secured to the front wall of the cabinet, and the guides having means for arresting downward movement of the arms, when the door is swung to its full-open position, and the upper door section having anti-friction means engageable with means at each end of the door opening to facilitate opening and closing of the door.

The particular object of the invention therefore is to provide an improved food-preserving cabinet.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings, forming part of this specification;

Figure 1 is a vertical sectional view on the line 1—1 of Figure 2, showing the door in closed position;

Figure 3 is a detailed fragmentary view illustrating the door in its open position, as when used for a shelf or table top;

Figure 6 is a detailed sectional view on the line 6—6 of Figure 3, showing the slidable connection between the lower end of the door supporting arms and the vertical guides provided on the front wall of the cabinet.

Figure 2:
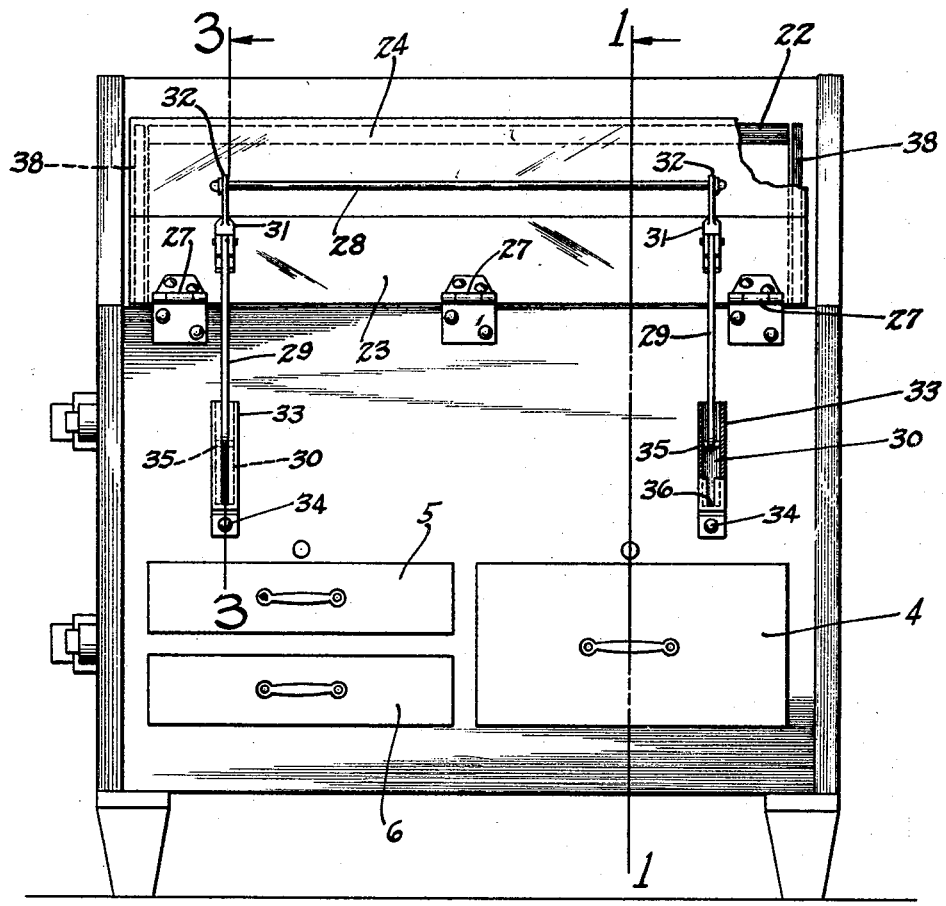
Figure 2 is a front view of Figure 1.

In the selected embodiment of the invention here shown, there is illustrated, for purposes of disclosure, a food-preserving cabinet comprising a lower heated chamber 2 having heating elements 3 mounted adjacent the bottom thereof. A plurality of food containing drawers 4, 5, and 6, are preferably mounted in the chamber 2 and have their walls spaced from the walls of the cabinet to provide air circulating passages around the drawers, as particularly shown in Figure 1.

The drawer 4 may be provided at its top with a slide 4a, cooperating with a wall 4b to provide a closure for the drawer. This slide may be operated by a rod 4c having a finger grip 4d. The constructional details of these drawers is fully described in my pending application above mentioned, and it is thought unnecessary to describe them in detail in this case.

Figures 4, 5:
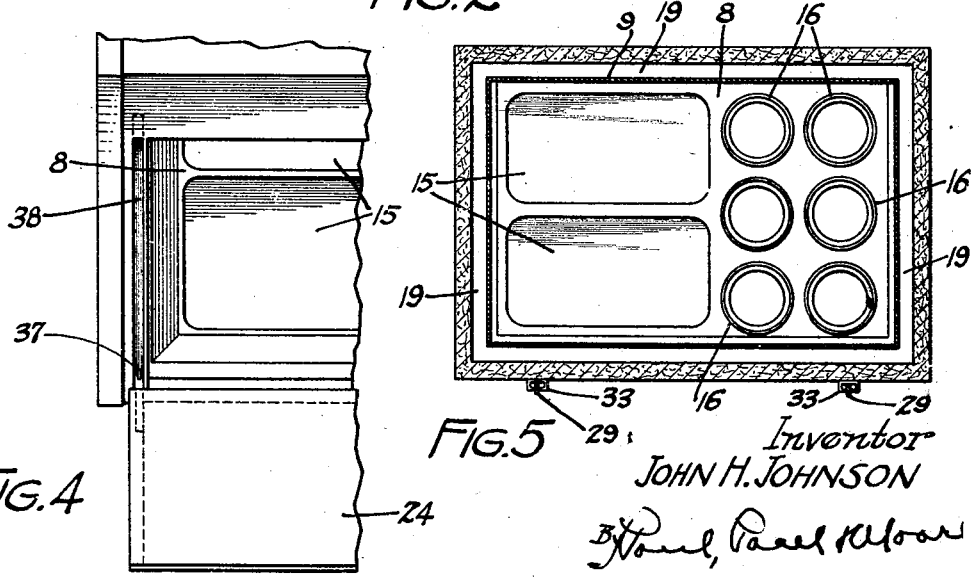
Figure 4 is a detailed plan view of Figure 3, showing the anti-friction means provided at each end of the door opening for guiding the upper door section in its movements, during opening and closing.
Figure 5 is a sectional plan view on the line 5—5 of Figure 1.

In the form of cabinet here shown, a food dispensing chamber 7 is provided in the upper portion of the cabinet. This dispensing chamber is defined by walls 8, 9, 11, and 12. A plurality of recesses or depressions 13 and 15 are provided in the bottom wall 8 of the chamber 7, adapted to receive the usual food containers 16, as shown in Figure 1. These recesses may be of any desired form suitable to receive the food containers which are to be supported in the dispensing chamber. In Figure 5, I have shown the recesses 15 as being rectangular in form and adapted to support correspondingly shaped trays, such as are commonly utilized for containing meats and similar articles of food.

The walls of the recesses 13 and 15, depend into a heated chamber 17, suitably heated by such means as for example, electric heating elements 18. Air-circulating passages 19 are provided between the walls 9 and 11 of the dispensing chamber 7 and the back and top walls respectively of the cabinet, as shown in Figure 1. Similar air-circulating passages 19 are provided at each end of the chamber 7, and these air-circulating passages communicate with the heated chamber 17 so that the walls 8, 9, and 11 and also the end walls of the display chamber, will be uniformly heated to maintain hot the food contained in the receptacles 16, shown in Figure 1.

An opening 22 is provided in the inclined wall 12 of the dispensing chamber 7 through which access may be had to the food containers arranged therein. This opening is adapted to be closed by a foldable door comprising a lower section 23 and an upper section 24, pivotally connected together by means of hinges 25, as shown in Figures 1 and 3. The lower door section 23 is hinged to the upright wall 26 of the cabinet by suitable hinges 27. The lower section 23 also has a handle or hand grip 28 by means of which an attendant may conveniently open the door to gain access to the food contained in the chamber 7.

An outstanding feature of this invention resides in the means provided for supporting the foldable door in its open horizontal position, whereby the latter may be temporarily used as a shelf or table top for supporting a tray or plate, while the attendant places food therein. The means provided for thus supporting the door in a horizontal position is best shown in Figure 3, and comprises a pair of bent arms 29 having their upper ends pivotally connected to the lower door section 23 by means of brackets 31, suitably secured thereto. These brackets 31 are here shown as having extensions 32 adapted to support the hand rail 28. The lower ends of the arms 29 are slidably engaged with vertical guides 33 secured to the front wall 26 of the cabinet by suitable bolts 34. The guides 33 are provided with slots 30 adapted to receive the T-shaped heads 35 of the arms 29, as shown in Figures 3 and 6. When the door is in its closed position, the arms 29 will assume the positions shown in Figure 1, wherein it will be noted that the T-shaped heads 35 of the arms will be spaced from the bottoms 36 of the guide slots 34. When the door is opened, the T-shaped heads of the arms 29 will slide downwardly in the slots 34 until they engage the bottoms 36 thereof, whereby the downward movement of the arms will be arrested, resulting in the door coming to rest in the position shown in Figure 3. In usual practice, the upper door section 24 is folded over upon the lower section 23 as shown in full lines in Figure 3 whereby, it will be noted that the upper surface of the door section 24 will be substantially horizontal. If desired, however, it may be swung to its unfolded position shown in dotted lines in Figure 3, which facilitates the cleaning of the inside of the door.

To facilitate opening and closing of the door sections 23 and 24, the upper door section 24 is preferably provided at each end with an anti-friction roller 37, adapted to travel in grooves 38, shown in Figure 4. By means of these anti-friction rollers 37 and grooves 38, the upper door section 24, during its opening and closing movements, will assume a position indicated in dotted lines in Figure 3, which clearly illustrates the advantage gained in the provision of these anti-friction rollers.

By thus constructing the door of two sections and supporting it in the particular manner described, when open, it will readily be seen that the door actually performs two functions; first, it provides means for closing the opening 22 to the dispensing chamber 7; and secondly, it provides a shelf or support upon which to place trays and food containers when moving food into and out of the chamber 7. The particular construction of the arms 29 and their connections with the wall 26 of the cabinet provides a very rugged support for the door sections, when open.

I claim as my invention:

1. A food cabinet having an upper compartment formed with an inclined disposed opening, a door for closing said opening composed of hinged together sections, the lower section also being hinged to a wall of the cabinet, and a hinged and slidable arm of angular elbow formation, the upper angle being pivotally connected at one end to the upper section of the door and the lower part of the arm slidably hinged to a wall of the cabinet, said elbow-shaped arm being foldable against an upright wall of the cabinet when the door sections are closed, with the upper angular portion overlying one section of the door and when the door is opened the lower angular portion of the arm standing out from the cabinet wall to support the door sections in a substantially horizontal plane to constitute a shelf.

2. A food cabinet having an upper compartment formed with an inclined disposed opening, a door for closing said opening composed of hinged together sections, the lower section also being hinged to a wall of the cabinet, and a hinged and slidable arm of angular elbow formation, the upper angle being pivotally connected at one end to the upper section of the door and the lower part of the arm slidably hinged to a wall of the cabinet, said elbow-shaped arm being foldable against an upright wall of the cabinet when the door sections are closed, with the upper angular portion overlying one section of the door and when the door is opened the lower angular portion of the arm standing out from the cabinet wall to support the door sections in a substantially horizontal plane to constitute a shelf, the upper section of the door having a slidable connection with the cabinet along the inclined opening therein to adapt the door sections to stand at an inclination to each other and to the cabinet when in partly open position.

3. A food cabinet having a lower heating compartment and an upper dispensing compartment in communication with each other along the sides of the cabinet, and an upper compartment provided with a shelf formed with depressed portions forming chambers with closed bottoms, adapted each to receive a container.

In witness whereof, I have hereunto set my hand this 14th day of February, 1928.

JOHN H. JOHNSON.